United States Patent
Reuschel

(10) Patent No.: US 7,717,248 B2
(45) Date of Patent: May 18, 2010

(54) PROCESS AND DEVICE FOR CONTROLLING AND/OR REGULATING AN AUTOMATED CLUTCH

(75) Inventor: Michael Reuschel, Ottersweier (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 575 days.

(21) Appl. No.: 11/708,503

(22) Filed: Feb. 20, 2007

(65) Prior Publication Data

US 2007/0209898 A1 Sep. 13, 2007

(30) Foreign Application Priority Data

Mar. 9, 2006 (DE) ............ 10 2006 010 936

(51) Int. Cl.
*F16D 48/06* (2006.01)

(52) U.S. Cl. .................. 192/54.4; 192/54.1; 192/84.6; 701/67

(58) Field of Classification Search .............. None
See application file for complete search history.

(56) References Cited

U.S. PATENT DOCUMENTS

| 5,850,898 A | * | 12/1998 | Bohme et al. | ............ 192/54.3 |
| 2004/0188218 A1 | * | 9/2004 | Berger et al. | ............ 192/84.6 |
| 2007/0199790 A1 | * | 8/2007 | Whitmer et al. | ......... 192/70.252 |

* cited by examiner

*Primary Examiner*—Rodney H Bonck
(74) *Attorney, Agent, or Firm*—Simpson & Simpson, PLLC

(57) ABSTRACT

In a process which is for controlling and/or regulating an automated clutch, in particular in the drive train of a vehicle, and in which an actuating element, whose position determines the clutch torque transmissible by the clutch, is actuated for setting a predefined clutch torque according to a characteristic curve, the actuating element is actuated according to a characteristic curve which in a first range of the clutch torque specifies the clutch torque as a function of the position of the actuating element and in a second range of the clutch torque specifies the clutch torque as a function of the force applied to the clutch by the actuating element.

8 Claims, 3 Drawing Sheets

PROCESS AND DEVICE FOR CONTROLLING AND/OR REGULATING AN AUTOMATED CLUTCH

CROSS REFERENCE TO RELATED APPLICATIONS

This patent claims priority of German Patent Application No. 10 2006 010 936.8, filed Mar. 9, 2006, which application is incorporated herein by reference.

FIELD OF THE INVENTION

The invention relates to a process and device for controlling and/or regulating an automated clutch, in particular in the drive train of a vehicle.

BACKGROUND OF THE INVENTION

Automated clutches are increasingly finding use in modern motor vehicles. The control or regulation of the clutch is usually done with the aid of a characteristic curve which specifies the clutch torque as a function of the position of an actuating element. The actuating element is moved by an actuator into the position corresponding to the transmissible clutch torque desired in each case.

A problem occurring in clutch control or regulation lies in the fact that in the torque characteristic curve there are one or more ranges in which the transmissible clutch torque changes very sharply when there is a change of the position of the actuating element so that great demands are placed on the actuator moving the actuating element and the control or regulation of the actuator.

SUMMARY OF THE INVENTION

The invention is based on the objective of specifying a clutch control or regulation process in which, despite reduced complexity in the control or regulation, a high quality of control or regulation is achieved.

In a process according to the invention and for controlling and/or regulating an automated clutch, in particular in the drive train of a vehicle, an actuating element, whose position determines the clutch torque transmissible by the clutch, is actuated for setting a predefined clutch torque according to a characteristic curve, where the actuating element is actuated according to a characteristic curve which in a first range of the clutch torque specifies the clutch torque as a function of the position of the actuating element and in a second range of the clutch torque specifies the clutch torque as a function of the force applied to the clutch by the actuating element.

With the process according to the invention it is achieved that the clutch torque's change, as a function of the control variable determining the position of the actuating element, is held in a manageable range, e.g., one as small as possible, so that at the precision with which the control variable of an actuator actuating the actuating element is controlled or regulated, no demands are made which can only be met with great effort.

Advantageously, in the clutch torque range in which one uses the characteristic curve which specifies the clutch torque as a function of the force, the change of the clutch torque associated with a predefined change of the position of the actuating element is greater than in the other clutch torque range.

In a process according to the invention a force/path characteristic curve of the actuating element can be incorporated, where via the characteristic curve the clutch torque/force characteristic curve and the clutch torque/path characteristic curve can be adapted to one another.

In a device according to the invention which is for controlling and/or regulating an automated clutch, in particular in the drive train of a vehicle, and which comprises an actuator for moving an actuating element for the clutch and an electronic control device which controls the actuator as a function of operational parameters and according to characteristic curves stored in the electronic control device, at least two characteristic curves are stored in the control device, where one of the two characteristic curves includes the transmissible clutch torque as a function of the position of the actuating element and the other characteristic curve includes the transmissible clutch torque as a function of the force applied to the clutch by the actuating element and in the control device a change-over device is provided which changes over the control of the actuator from one characteristic curve to the other.

In at least one range of the transmissible clutch torque one of the two characteristic curves is activated and in another range of the transmissible clutch torque the other characteristic curve is activated.

The change-over device activates, for example, the characteristic curve which specifies the clutch torque as a function of the force in a range of the clutch torque in which the change of the clutch torque associated with a predefined change of the position of the actuating element is greater than in the other range of the clutch torque.

The clutch can, for example, be a clutch put into the closed position.

Furthermore, the clutch can advantageously be a clutch of a parallel shift gearbox. Such parallel shift gearboxes are known per se and comprise two sub-transmissions, each of which is assigned its own clutch, where each of the parallel shift gearboxes operates at the transmission ratio which is set in the transmission paths whose clutch is closed.

BRIEF DESCRIPTION OF THE DRAWINGS

The invention is explained with the aid of schematic drawings as examples and with additional details, in which.

DETAILED DESCRIPTION OF THE INVENTION

Figure 1:
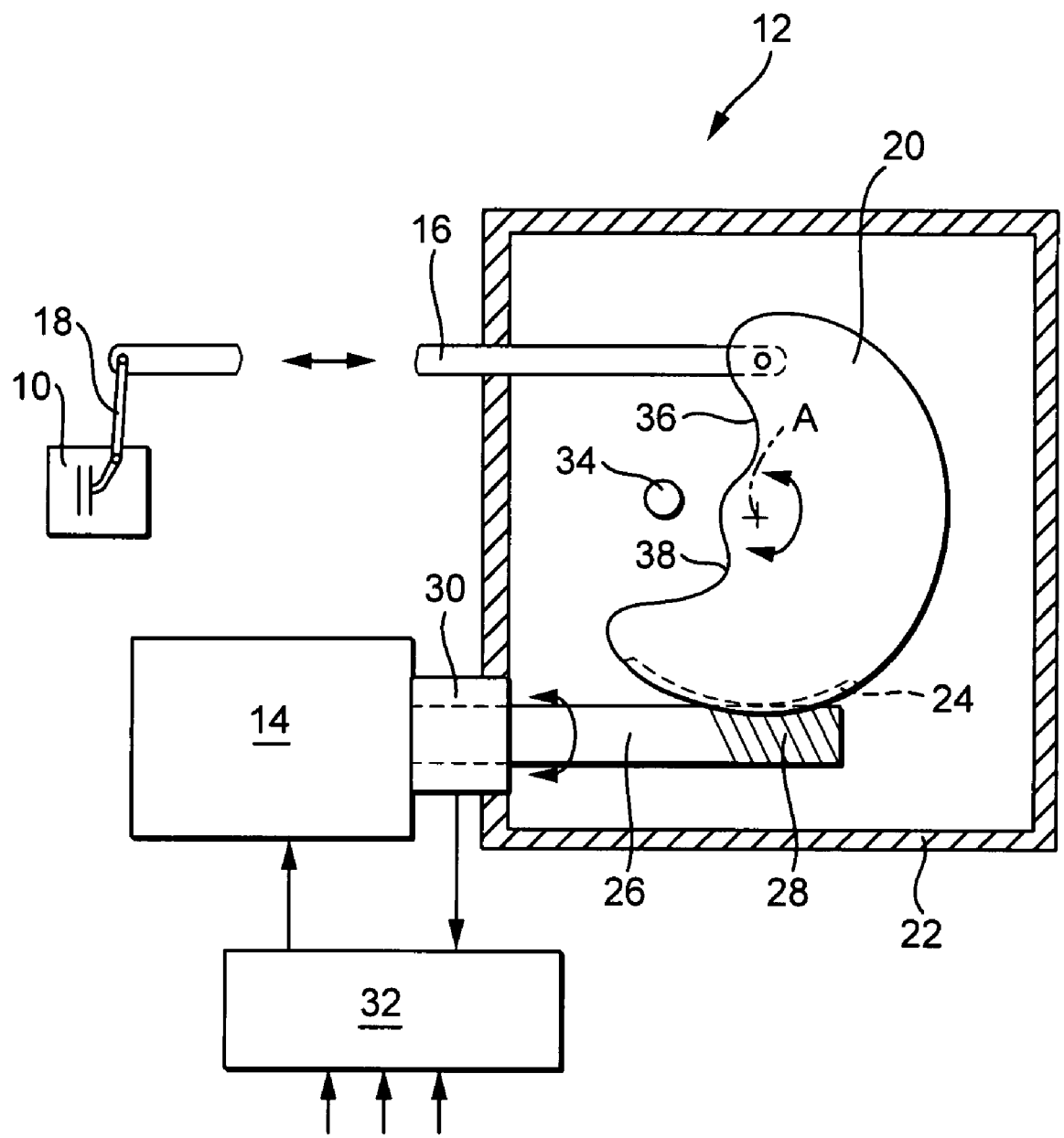
FIG. 1 is a schematic representation of a clutch-actuating device.

According to FIG. 1 a clutch designated overall by 10 is connected, via a transmission mechanism designated overall by 12, to an actuator, in the given example, electric motor 14.

The transmission mechanism comprises actuating element 16 which is connected directly, via additional coupling elements, or via a hydraulic transmission path connection to clutch lever 18 whose position determines the torque which can be transmitted by the clutch.

Actuating element 16 is connected in the manner of a hinge to segmented wheel 20, which is mounted in such a manner that it can rotate about axis A in housing 22. Housing 22 can be connected in a fixed manner to the housing of the clutch or to a transmission housing.

Segmented wheel 20 comprises on circumferential area toothing 24 which meshes with spiral threading 28 formed on output shaft 26 of electric motor 14. To detect turning of output shaft 26 increment counter 30 is provided.

Electronic control device 32 with a microprocessor and associated storage devices serves to control electric motor 14, where one input is connected to increment counter 30 and additional inputs are connected, in given cases via a bus, to outputs of sensors or another control device, where via these outputs, control device 32 is supplied with data relevant to the operation of the clutch. One output of control device 32 is connected to electric motor 14.

The ability of segmented wheel 20 to turn is limited by at least one stop 34 which stop face 36 of the segmented wheel abuts at the end of the actuation path of actuating element 16 during the turning of segmented wheel 20 in the counter-clockwise direction. The ability of segmented wheel 20 to turn in the clockwise direction is limited by the fact that additional stop face 38 comes to abut stop 34.

The design and function of the arrangement described are known per se and are thus not explained in detail in so far as they are known.

In control device 32 at least one characteristic curve is stored which specifies the torque which can be transmitted by clutch 10 as a function of the position of clutch lever 18 or of that of actuating element 16. The position of actuating element 16 is known by using increment counter 30, whose counter state is indexed by absolute calibration of the counter state, as needed or periodically, by, for example, segmented wheel 20 being moved up to abutment with stop 34 so that from the counter state the position of actuating element 16 can be deduced. Other possibilities for updating the characteristic curve repeatedly consist in updating the closed state of the clutch or its point of engagement by slip and/or torque measurement of the clutch and the assignment of the counter state to predefined function states of the clutch.

Figure 2:
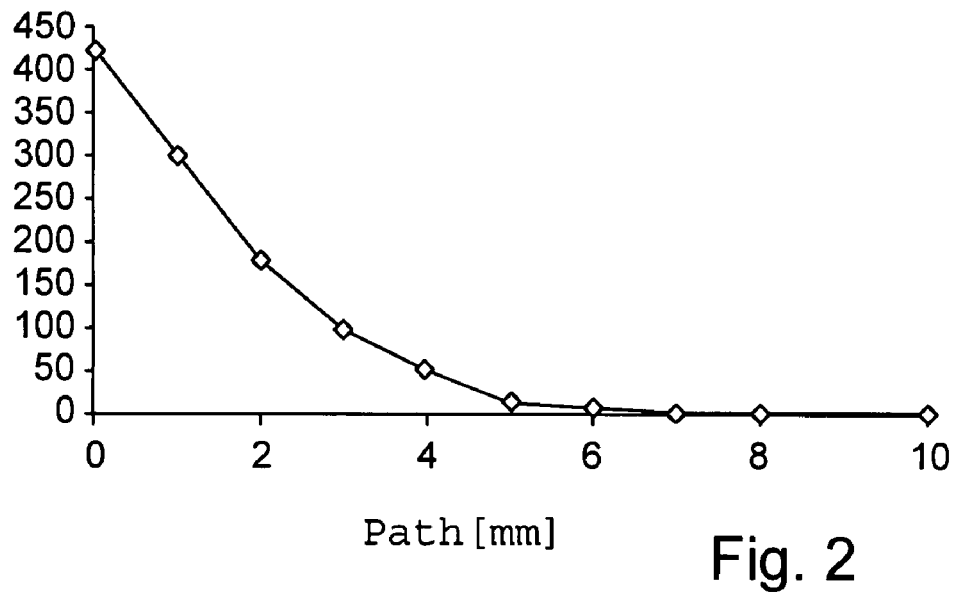
FIGS. 2 to 5 illustrate different characteristic curves to explain the invention.
Figure 3:
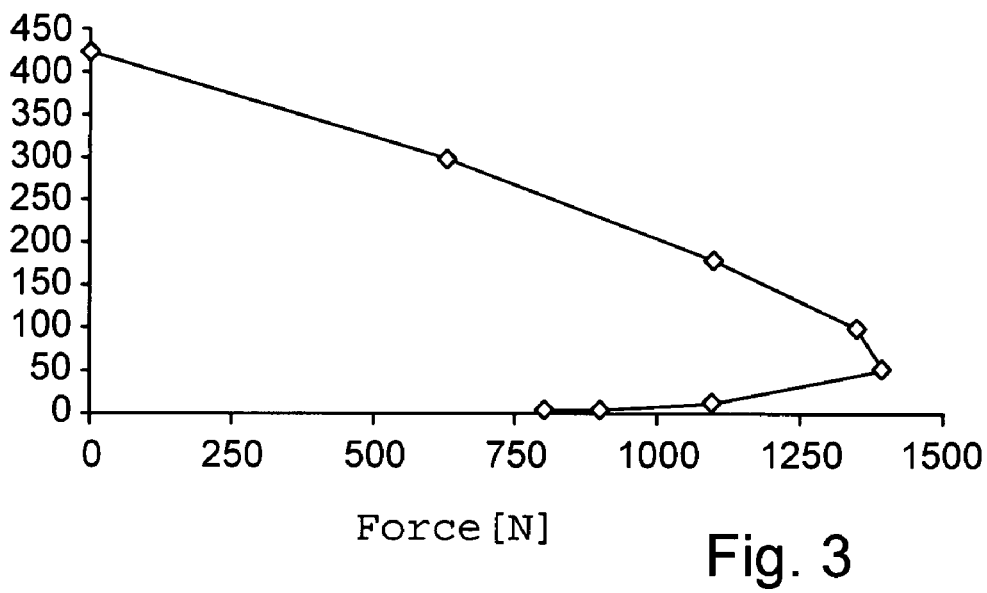

Depending on the springs used in the clutch, the kinematic transmission ratios, and the type of construction of the clutch (closed or open), the transmissible clutch torque as a function of the path or the position of actuating element 16 can have the most varied forms. FIG. 2 shows an example of such a characteristic curve, which runs relatively flat in the range between a transmissible torque from 0 to 100 Nm and above 100 Nm becomes increasingly steeper. FIG. 3 shows the characteristic curve for this exemplary clutch, said characteristic curve specifying the transmissible clutch torque as a function of the force applied to actuating element 16 or clutch lever 18. The curve of the transmissible torque over the force, in the given example the disengagement force, is relatively flat in the range above 100 Nm. Below this value the curve is no longer single-valued since the force runs through a maximum as a consequence of the kinematics of the clutch.

Figure 4:
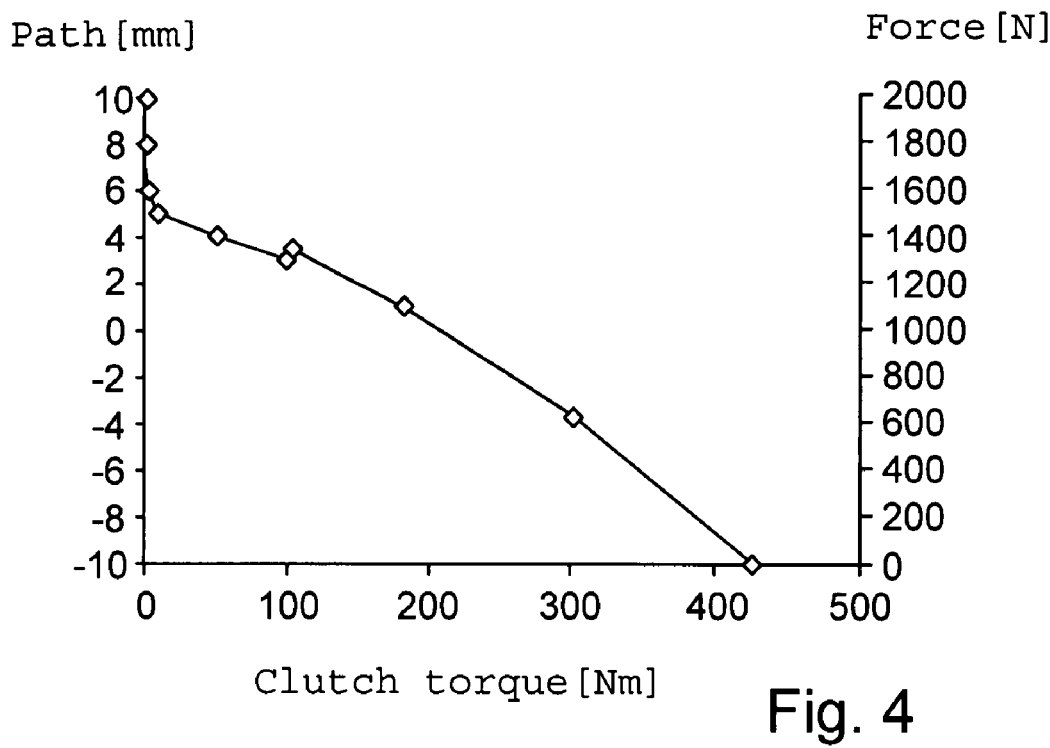

According to the invention, both characteristic curves are stored in storage device 32 and the control or regulation of the clutch below a predefined transmissible clutch torque is done with the aid of the clutch torque/path characteristic curve of FIG. 2 and above this transmissible torque, e.g., 100 Nm, according to the clutch torque/force characteristic curve of FIG. 3. FIG. 4 shows the control characteristic curves combined from FIGS. 2 and 3 in reversed form, that is, the clutch torque is plotted on the horizontal axis. The path is plotted on the left ordinate, the force on the right ordinate. Should the clutch torque to be controlled by control device 32 lie under 100 Nm, the left part of the characteristic curve is used. Above 100 Nm the right part of the characteristic curve is used. Through adaptation of the characteristic curves as needed or cyclically, or immediately, a force/path characteristic curve not represented is generated in control device 32, with which it is ensured that the two characteristic curve sections of FIG. 4 pass smoothly into one another.

If processing is done with a path-controlled clutch torque, control device 32 sets the position of actuating element 16 with the aid of increment counter 30. If the transmissible clutch torque is set by the force to be applied to the clutch, electric motor 14 is driven, e.g., under voltage control, since the force exerted by it on actuating element 16 is a function of the voltage with which electric motor 14 is energized.

With driving of clutch 10, by way of example by means of hydraulic pressure, a pressure sensor detecting the hydraulic pressure is used, with whose aid the pressure of the hydraulic medium is controlled. It is understood that the force applied to clutch 10 can also be measured directly with any suitable force sensor, according to whose output signal electric motor 14 is driven.

The process according to the invention, in which in different ranges there is a change-over to different control processes, e.g., force control, path control, pressure control, etc., is particularly well-suited when there is a harmonic curve of the force/path characteristic curve of the clutch, as there is, for example, with closed, dry clutch or also wet-running clutches.

Advantageously, processing in each case is done with the characteristic curve in which the clutch torque to be set has little dependence on the variable set directly by the actuator (position of the actuating element, force exerted on the actuating element).

Figure 5:
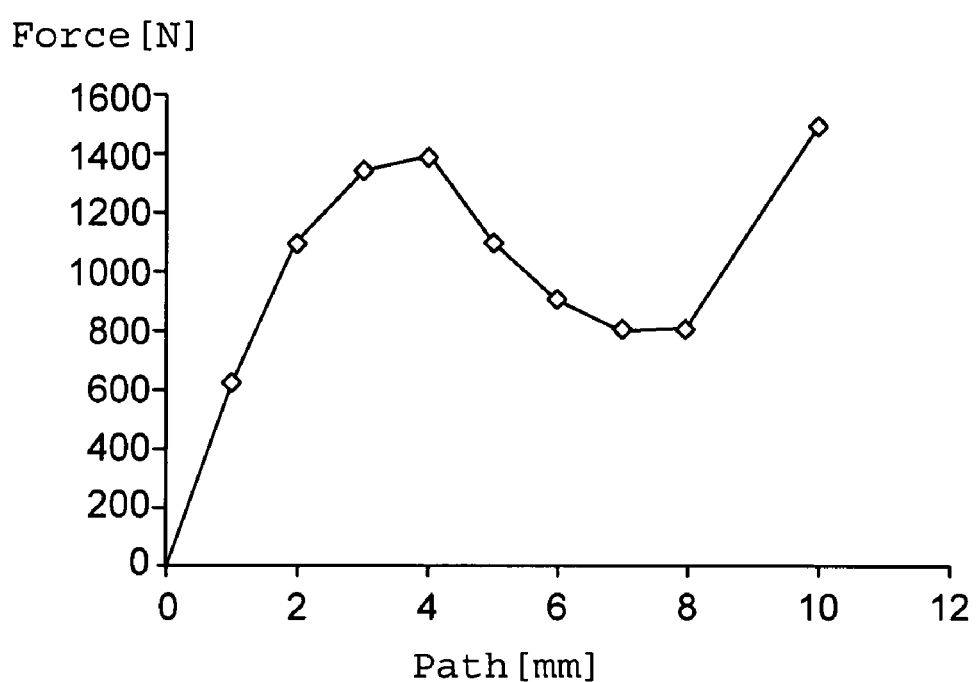

FIG. 5 shows an example of a force/path characteristic curve of a clutch whose actuation force does not exceed 1400 Nm and with an actuation path reaching from approximately 4 mm to approximately 10 mm. Between these positions the actuation force runs through a minimum.

The value ranges and curves described above are only exemplary. The invention is suitable for all the types of clutches with clutch torque/path characteristic curves and clutch torque/force characteristic curves of different slopes, where advantageously the slope of the clutch torque/path characteristic curve is large in a clutch torque range in which the slope of the clutch torque/force characteristic curve is small and conversely. Also for reasons, for example, of poor controllability of the voltage in a predefined voltage range or for reasons of rapidity advantages of a voltage control vis-à-vis path control there can be change-over between different types of control. In each case, the change-over can take place at a predefined position of actuating element 16, which, for example, is detected via increment counter 30, when there is a predefined voltage present at electric motor 14 or also when there is a predefined transmissible torque of clutch 10, which can be detected by registering the torque and the rotary speed of a motor connected to the drive shaft of the clutch as well as the slip of the clutch.

LIST OF REFERENCE NUMBERS

10 Clutch
12 Transmission mechanism
14 Electric motor
16 Actuating element
18 Clutch lever
20 Segmented wheel
22 Housing
24 Toothing
26 Output shaft
28 Spiral threading
30 Increment counter
32 Control device
34 Stop
36 Stop face
38 Stop face

What I claim is:

1. A process for controlling and/or regulating an automated clutch, and in which an actuating element, whose position determines the clutch torque transmissible by the clutch, is actuated for setting a predefined clutch torque according to a characteristic curve, comprising the step of actuating the actuating element according to a characteristic curve which, in a first range of the clutch torque, specifies the clutch torque as a function of the position of the actuating element and, in a second range of the clutch torque, specifies the clutch torque as a function of the force applied to the clutch by the actuating element, wherein a change of the clutch torque associated with a predefined change of the position of the actuating element is greater in the second range of clutch torque than in the first range.

2. The process recited in claim 1, wherein a force/path curve of the actuating element is incorporated, where via said force/path curve the characteristic curve in the first range of clutch torque is adapted to the characteristic curve in the second range of clutch torque for enabling smooth transition of the actuating element between said characteristic curve in the first and second ranges of clutch torque.

3. A device for controlling and/or regulating an automated clutch, comprising an actuator (14) for moving an actuating element (16) of the clutch (10) and comprising an electronic control device (14) which controls the actuator as a function of operational parameters and according to characteristic curves stored in said electronic control device, wherein at least two characteristic curves are stored in the control device (14), where a first characteristic curve of the two characteristic curves includes the transmissible clutch torque as a function of the position of the actuating element (16) and a second characteristic curve includes the transmissible clutch torque as a function of the force applied to the clutch by the actuating element and in the control device a change-over device is provided which changes over the control of the actuator from one characteristic curve to the other, wherein the first characteristic curve is activated in at least a first range of the transmissible clutch torque, and the second characteristic curve is activated in at least a second range of the transmissible clutch torque, and wherein a change of the clutch torque associated with a predefined change of the position of the actuating element is greater in the second range than in the first range.

4. The device recited in claim 3, wherein the clutch (10) is operatively arranged to be placed into a closed position.

5. The device recited in claim 3, wherein the clutch (10) is arranged for a parallel shift gearbox.

6. The device recited in claim 3, wherein the change-over device activates a third characteristic curve, wherein the third characteristic curve is a force/path characteristic curve for adapting the first characteristic curve to the second characteristic curve for enabling smooth transition between said first and second characteristic curves.

7. A process for controlling and/or regulating an automated clutch with a control device, wherein an actuating element, whose position determines the clutch torque transmissible by the clutch, is actuated for setting a predefined clutch torque according to a characteristic curve, comprising:
 (a) storing and repeatedly updating a torque/path curve based on operation of said clutch;
 (b) determining a first range of clutch torque and a second range of clutch torque, wherein a first portion of a slope of said torque/path curve in said first range is flatter than a second portion of said slope of said torque/path curve in said second range;
 (c) defining the characteristic curve in the first range of the clutch torque as a function of the position of the actuating element, and in the second range of the clutch torque as a function of the force applied to the clutch by the actuating element; and,
 (d) actuating the actuating element according to the characteristic curve.

8. The process recited in claim 7, wherein said characteristic curve is further defined by a force/path curve, wherein said force/path curve adapts said characteristic curve in said first range to said characteristic curve in said second range for enabling smooth transition of said characteristic curve between said first and second ranges.

* * * * *